United States Patent

[11] 3,584,754

| [72] | Inventor | Jack E. Moll |
| | | New Berlin, Wis. |
| [21] | Appl. No. | 850,018 |
| [22] | Filed | Aug. 14, 1969 |
| [45] | Patented | June 15, 1971 |
| [73] | Assignee | Miller Tilt-Top Trailer, Inc. |
| | | Milwaukee, Wis. |

[54] TILTING TRAILER
5 Claims, 3 Drawing Figs.

[52] U.S. Cl. .................................................. 214/505, 280/423
[51] Int. Cl. .................................................. B60p 1/28
[50] Field of Search .......................................... 214/505, 506; 280/423, 423 B, 425

[56] References Cited
UNITED STATES PATENTS
2,717,707  9/1955  Martin ........................ 214/505
3,228,547  1/1966  Coordes ...................... 214/506

*Primary Examiner*—Albert J. Makay
*Attorneys*—John W Michael, Gerrit D. Foster, Bayard H. Michael, Paul R. Puerner, Joseph A. Gemignani, Andrew O. Riteris, Daniel Van Dyke and Spencer B. Michael

ABSTRACT: A main load platform is pivotally connected to the lower frame portion of a gooseneck trailer in which the gooseneck forms a load carrying platform portion. The platform is raised and lowered by hydraulic operated ram cylinders between a level transport position in which the gooseneck as well as the main platform are generally horizontal, and a loading position wherein the main platform is tilted so that its trailing edge meets the ground and its leading edge meets the trailing edge of the gooseneck platform portion to thereby permit the load or a part thereof to be driven directly onto the gooseneck platform portion.

PATENTED JUN 15 1971
3,584,754
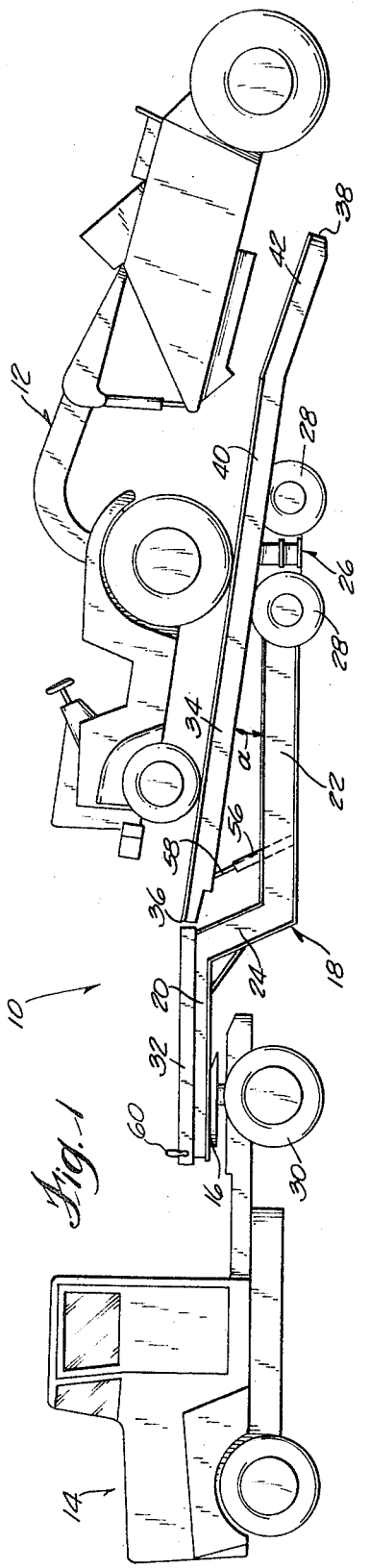
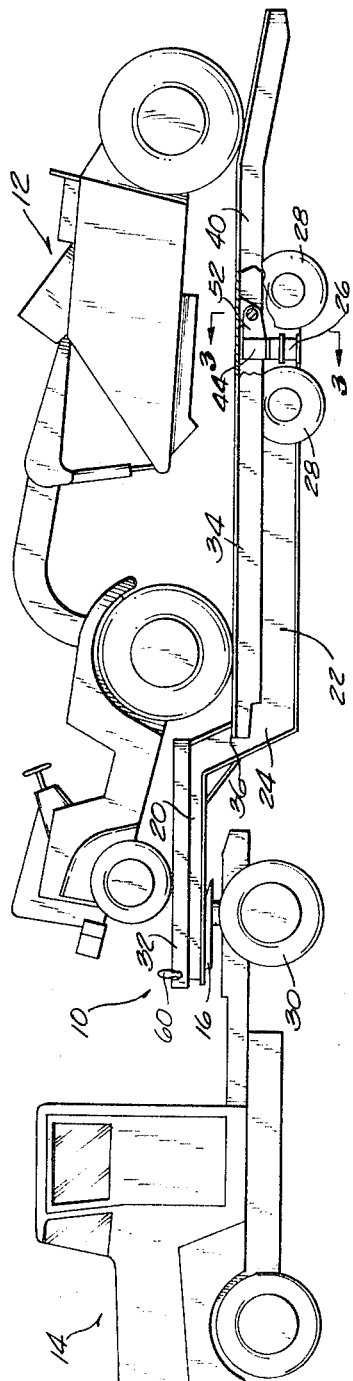
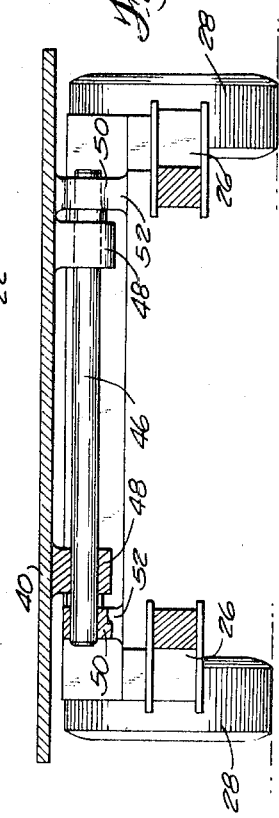
Inventor
Jack E. Moll
By Andrew O. Riteris
Attorney

3,584,754

TILTING TRAILER

BACKGROUND OF THE INVENTION

1. Field of Invention

This invention relates to improvements in vehicular drawn trailers and, more particularly, to a power driven tiltable trailer top permitting self loading of vehicles to be transported.

2. Description of Prior Art

In conventional tilting gooseneck trailers the platform is generally balanced about its pivot axis. It is lowered manually and raised by the shifting weight of the vehicle driven onto it. This creates shock problems as the weight shifts quickly when loaded. The above device also prohibits the loading of vehicles whose weight is distributed to the rear such that the center of weight never moves forward of the pivot axis.

Most tilting gooseneck trailers also comprise a stationary desk section calling for a rather steep loading angle.

SUMMARY OF INVENTION

A principal object of this invention is to provide a tilting gooseneck trailer which is hydraulically raised and lowered and has an extremely small loading angle.

Another important object of this invention is to provide a tilting gooseneck trailer with the entire lower deck being tiltable.

For achievement of these and other objects this invention proposes a tilting gooseneck trailer having an upper deck and a lower deck, the lower deck being pivotally mounted on the trailer chassis to tilt between a substantially level load transporting position and a tilted loading position wherein the leading edge of the lower deck meets the trailing edge of the upper deck and the trailing edge of the lower deck meets the ground. The tilting deck is operated by at least one double acting hydraulic ram cylinder operated by a power driven hydraulic system. The hydraulic ram cylinder is pivotally connected between the front portion of the lower deck and the front portion of the lower frame portion of the trailer chassis.

As a result of the above arrangement a single operator can hydraulically raise and lower the tilting desk and load the vehicle to be transported.

DESCRIPTION OF THE DRAWINGS

FIG. 1 shows the tilting trailer proposed by this invention in a tilted loading position;

FIG. 2 shows the tilting trailer proposed by this invention in a level transport position; and FIG. 3 is a cross section of the pivoting assembly taken generally along line 3-3 of FIG. 2.

DESCRIPTION OF PREFERRED EMBODIMENT

Referring now to the drawings in detail, FIG. 2 shows the trailer combination 10 proposed by this invention in a fully loaded transport position with an earth mover 12 representing a typical load to be transported. The trailer 10 is drawn by a towing vehicle or tractor 14, the trailer being adapted to connect and disconnect to the fifth wheel 16 of the tractor. The details of the tractor need not be described for purposes of this invention, it being conventional and well understood in the art.

Due to the size and weight of a typical piece of construction equipment transported by the trailer, it is extremely desirable that the main portion of the load carrying deck be as close to the ground as practical. There are several reasons for this, an important one being that the tilting angle of the trailer top, to be described hereinafter, is minimized. An additional reason is that the lower the load is at transport speeds, the more stable it is.

FIGS. 1 and 2 show a preferred trailer 18 known as a gooseneck trailer frame. A gooseneck trailer is comprised of a bilevel trailer frame having an upper frame portion 20 which is necessitated by the coupling of the trailer to the fifth wheel 16 of the tractor and a lower frame portion 22 which supports the main body of the load carriage deck. Frame portions 20 and 22 are connected by an intermediate frame portion 24, the entire frame preferably comprised of parallel spaced I-beams suitably joined and supported. The lower frame portion 22 is connected to an axle assembly 26 comprised of tandem wheels 28,28 which are considerably smaller than the two wheels 30 of the towing vehicle thereby enabling the main or lower frame portion 22 of the trailer frame to be located close to the ground.

Attached to the upper frame portion 20 is a fixed load deck 32. Attached to the lower frame portion 22 is a tiltable load deck 34 which is pivotally mounted to tilt between a level transport position as shown in FIG. 2 and a tilted loading position as shown in FIG. 1. In the loading position, deck 34 is characterized by its leading edge 36 rising to the height of deck 32 to permit the driving of a portion of a transport load onto the upper deck 32. In addition, the trailing edge 38 is brought into contact with the ground to permit the driving of the transport load onto decks 32 and 34. Upon loading the trailer, load deck 34 is pivoted to a level transport position shown in FIG. 2 with the leading edge 36 of deck 34 being lowered until seated upon lower frame portion 22 with the lower deck 34 assuming a substantially level position. Due to the length and height of load deck 34, the platform is preferably comprised of two portions, a main portion 40 which is level while in a transport position, and a smaller trailing portion 42 which slopes slightly downward from the main portion 40 to reduce the tilting angle "$a$" when deck 34 is in a loading position.

Load deck 34 is pivotally connected to the lower trailer frame 22 over the rear axle assembly 26. Due to the closeness of the load deck 34 to the trailer wheels 28,28, a novel pivot assembly 44 is provided to enable the load deck 34 to be tilted without interfering with or coming into contact with trailer wheels 28,28. Conventionally, a rod 46 is fixed to a pair of spaced brackets 48,48, the rod 46 being mounted in a pair of spaced bearings 50,50 which are secured to the trailer frame 22, above the axle assembly 26. However, in order to obtain proper clearance between the trailer deck and wheels in the tilted position, a pair of support tabs 52 are provided, the tabs extending rearwardly thereby moving the pivotal axis of the load deck 34 to the rear of the axle assembly. In this fashion, the load deck 34 can be tilted into a loading position without interfering with the trailer wheels 28,28.

A power driven hydraulic means is provided for raising and lowering the load deck. Preferably, a pair of adjacently spaced hydraulic cylinders 54 extend between the front portion of load deck 34 and the front portion of lower frame portion 22 of trailer 10. Hydraulic cylinders 54 are comprised of a cylinder 56 and a telescoping ram 58, the cylinders being pivotally connected to frame portion 22, with rams 58 extending to and pivotally connected to the under portion of load deck 34. Hydraulic cylinders 54 are operated by a hydraulic power assembly which is attached to the trailer and operated by the towing vehicle. Hydraulic cylinders 54 are dual acting so that the load deck 34 may be both raised and lowered under power.

As shown in the drawings, a typical load such as earth mover 12 is driven up onto the load carrying deck portions 32, 40 and 42 with the front wheels of the earth mover 12 resting on the fixed load deck 32, and the rear and intermediate wheels resting on the tilting load deck 34. As the deck 34 is pivoted into normal transport position, the earth mover 12 pivots likewise. It will be appreciated that, depending on the loads to be transported, more than one unit could be installed on the trailer, with a smaller unit resting on the fixed load deck 32 and one or more smaller units resting on load deck 34. The operation of the trailer proposed by this invention is extremely simple and requires the attention of only a single person.

The trailer is provided with a control unit whereby the deck 34 may be moved to the loading position, locked in such position, and returned to the level transporting position. The control unit may be actuated by a manual control lever 60 located at the side of the gooseneck. The control unit is comprised of a hydraulic pump which is driven by an electrical motor which is connected to the electrical system of the tractor. Since these elements are of known design, they are not shown. Lever 60 actuates a three-way solenoid valve. When the lever is in the vertical position, the hydraulic circuit of the cylinders is closed and, thus, the position of deck 34 is fixed. When the lever is turned in one direction, hydraulic fluid is supplied to the cylinders to raise the deck to the loading position. When the lever is turned in the other direction, the flow is reversed and the deck is moved to the transporting position.

Although but one embodiment of the present invention has been illustrated and described, it will be apparent to those skilled in the art that various changes and modifications may be made therein without departing from the spirit of the invention as described.

I claim:

1. The combination in a load carrying trailer comprising:
    a gooseneck trailer chassis having an upper and lower portion connected to an intermediate portion, said upper portion including an upper load deck and means for connecting the trailer to a powered vehicle;
    a lower deck connected to the lower portion of said chassis, said lower deck being substantially longer than said upper deck and having a leading and trailing edge;
    pivot means connecting said lower deck to the lower portion of said chassis;
    power means for rotating said lower deck about said pivot means between a substantially level load transporting position and a tilted loading position wherein the leading edge of the lower deck meets the trailing edge of the upper deck and the trailing edge of the lower deck meets the ground; and
    a wheel and axle system for supporting the trailer.

2. The combination according to claim 1 wherein said lower chassis portion is connected to said wheel and axle system and wherein said pivot means are positioned generally in the location of said wheel and axle system.

3. The combination according to claim 1 wherein said lower deck includes a forward and a trailing portion, said forward portion being substantially longer than said trailing portion and extending from the trailing edge of said upper portion beyond the rear of said chassis, said trailing portion of said lower deck extending downwards at an angle from said forward portion thereby requiring a reduced loading angle when said lower deck is tilted into its loading position.

4. The combination according to claim 1 wherein said power means comprises at least one hydraulic ram cylinder, said cylinder being pivotally mounted between the forward portion of said lower chassis portion and said lower deck, said hydraulic cylinder operable to raise and lower said lower deck between said transport and loading positions.

5. The combination according to claim 1 wherein:
    said pivot means includes a rotatable shaft fixed to said lower deck, said shaft is journaled in a pair of bearings secured to said axle system, said bearings positioned rearward in respect to the fore and aft centerline of said axle system to permit tilting of said lower deck without interfering with said axle system; and
    said power means comprises at least one hydraulic ram cylinder, said cylinder being pivotally mounted between the forward portion of said lower chassis portion and said lower deck, said hydraulic cylinder operable to raise and lower said lower deck between said transport and loading positions.